United States Patent [19]

Le Dantec et al.

[11] Patent Number: 4,553,889

[45] Date of Patent: Nov. 19, 1985

[54] EXPANDING PLUG

[75] Inventors: Olivier J. Le Dantec; Charly G. Balage, both of Lyons, France

[73] Assignee: Framatome & Cie, Courbevoie, France

[21] Appl. No.: 528,684

[22] Filed: Sep. 1, 1983

[30] Foreign Application Priority Data

Sep. 3, 1982 [FR] France ............................ 82 15032

[51] Int. Cl.4 ............................................. F16B 13/04
[52] U.S. Cl. ........................................ 411/21; 411/55;
411/344; 405/259
[58] Field of Search ............. 411/21, 51, 70, 340–346,
411/351, 55; 405/259–261

[56] References Cited

U.S. PATENT DOCUMENTS

| 1,247,621 | 11/1917 | Bennett | 411/344 |
| 2,377,086 | 5/1945 | Lang | 411/344 |
| 3,403,594 | 10/1968 | Newell | 411/344 |
| 3,534,650 | 10/1970 | Kubokawa | 411/344 |

Primary Examiner—Gary L. Smith
Assistant Examiner—Neill Wilson
Attorney, Agent, or Firm—Pollock, Vande Sande & Priddy

[57] ABSTRACT

The disclosure relates to an expanding plug intended for closing a cylindrical aperture provided in a wall and accessible from only one side. In one embodiment, the plug comprises a base which is applied against the front face of the wall, at least two gripping members which are inserted into the aperture with their ends protruding on the other side of the aperture, which are provided with an outwardly extending radial shoulder, and which are mounted for sliding in corresponding recesses provided in a central member, permitting their radial displacement through a pivoting displacement effected in the plane of the radial recesses, a screw control into the central member in order to effect simultaneously their radial displacement towards the outside and their longitudinal displacement in the direction of the rear face of the wall until the shoulders of the gripping members are applied against the rear face of the wall.

1 Claim, 4 Drawing Figures

EXPANDING PLUG

FIELD OF THE INVENTION

The present invention relates to an expanding plug, i.e., a removable device adapted to be rigidly installed inside an aperture provided in a wall, for the purpose of closing that aperture.

BACKGROUND OF THE INVENTION

Some existing expanding plugs are made of elastic material and are forced into the aperture which is to be closed, the plug being held by the radial forces exerted on the walls of the aperture. Devices of this kind have the disadvantage of requiring materials which have poor resistance to temperature and which age rapidly. In addition, plugs of this kind are difficult to fit in position, because they require complicated applicances to exert the considerable forces needed for inserting the plug inside the aperture.

Other plugs comprise mechanical arrahgements passing from one side to the other of the aperture which is to be closed, and requiring manual intervention from both sides of the wall in which the aperture is provided; intervention from both sides of the wall is not always possible. Moreover, it is difficult to design a system for the fitting of such plugs with the aid of a remote control apparatus because of the large number of operations required for putting the plug in position.

Other expanding plugs are provided with fastening means acting solely by friction. Devices of this kind are generally not very reliable, because their maintenance in the aperture depends on the coefficient of friction of the parts in contact with the walls of the aperture. This coefficient of friction may however vary, for example in accordance with variations of temperature, vibrations or the presence of fluid. Slippage is therefore always possible.

Other plugs are also known, for instance as disclosed by U.S. Pat. No. 3,267,793, in which a gripping member can be inserted inside the aperture and protrudes on the other side of the wall, and in which a screw means permits expansion of the elastic protruding parts of the member so that they can get a support on the inaccessible rear side of the wall. But in such plugs some parts of the gripping members must be less resistant to allow their expansion, and breakage could occur, especially in case of greai variations of temperature or of vibrations.

French Pat. Nos. 1,211,818 and 1,343,577 disclose plugs with gripping means for locking a plug in a duct, where gripping members are articulated on the plug and liable to be expanded by rotating around their axles so that their other ends will protrude beyond the external surface of the plug. Such mechanisms are somewhat expensive, owing to their articulations. Furthermore, and especially for plugs of low diameter, axles are brittle pieces liable to breakage. Breakage of such element can lead to the presence of uncontrolled free metallic pieces on the inaccessible side of the wall, and to serious damage to the installation.

The present invention consequently relates to an expanding plug which does not have the disadvantages mentioned above. This expanding plug is able to be fitted in position by extremely simple manipulations which can be carried out at a distance by remote-controlled apparatus. This plug is also able to be placed in position by intervention on only one side of the wall, and includes no brittle parts.

SUMMARY OF THE INVENTION

The invention relates to an expanding plug intended for closing a cylindrical aperture provided in a wall and accessible from only one side.

According to one characteristic of the invention, the plug comprises a base which is applied against the front face of the wall, at least two gripping members which are inserted into the aperture with their ends protruding on the other side of the aperture, which are provided with an outwardly extending radial shoulder, and which are mounted for sliding in corresponding recesses provided in a central member, permitting their radial displacement through a pivoting displacement effected in the plane of the radial recesses, a screw control member situated in the axis of the aperture and screwing into the central member in order to effect simultaneously their radial displacement towards the outside and their longitudinal displacement in the direction of the rear face of the wall until the shoulders of the gripping members are applied against the rear face of the wall.

BRIEF DESCRIPTION OF THE DRAWINGS

Other characteristics and advantages of the invention will emerge from the detailed description of an embodiment which is illustrated by the accompanying drawings.

DETAILED DESCRIPTION

Figure 1:
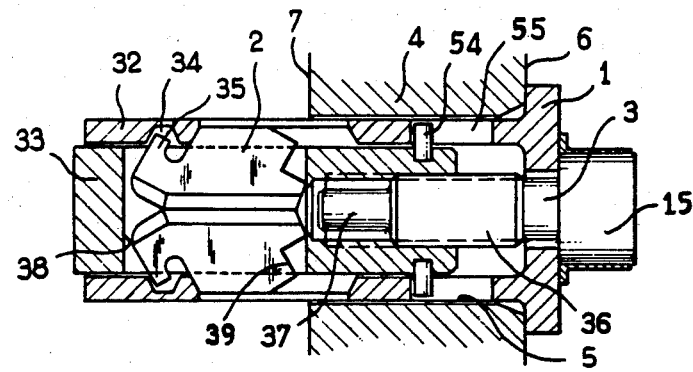
FIGS. 1, 2 and 3 show an expanding plug according to the invention, in three successive stages of the operation of fitting it in position.
Figure 2:
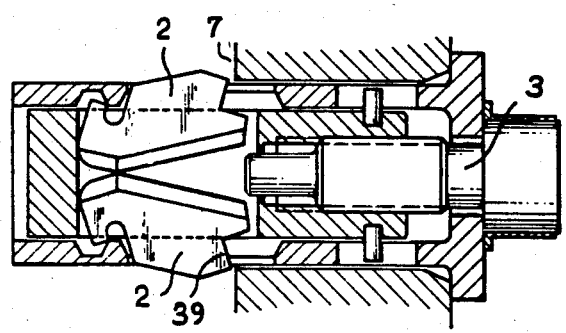
Figure 4:
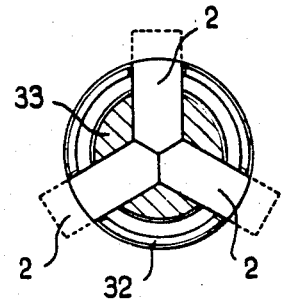
FIG. 4 is a cross-section on the line E—E in FIG. 3.

Referring to FIGS. 1 to 4, the plug comprises a base 1 having a cylindrical extension 32 sufficiently long to be able to pass right through the aperture 5 and protrude on the other side of the wall. This extension 32 has an internal bore in which is disposed a member 33 movable longitudinally but prevented from moving rotationally by studs 54 rigidly connected to the member 33 and engaged in a longitudinal slot 55 in the member 32. The plug also comprises three gripping members 2, each of which has two parallel side faces, so that these members can slide inside the member 33 and the member 32, in corresponding radial recesses which are provided both in the part 32 and in the part 33. The part 32 is also provided with an internal slot 34 adapted to engage a projection 35 of each gripping member 2. Finally, the plug is provided with a screw 3, the head 15 of which comes to bear against the base 1 and the threaded body 36 of which screws into a tapping provided in the member 33. The screw is in addition provided with a cylindrical portion 37 at its end. This same device is also conceivable with only two gripping members.

This plug is fitted in the following manner: the screw 3 being unscrewed and the members 2 being retracted inside the member 32, the plug is inserted into the aperture 5 in the wall (see FIG. 1). The screw is then operated in the tightening direction, which brings about the axial displacement of the member 33, the rear face 38 of the radial recesses of which comes to bear against the rear end of the members 2, thus bringing about a certain rotation of these members 2 and causing them to move partly out of the member 32. This rotation is produced through the fact that the end 35 of the members 2 remains engaged in the slot 34. The outward displacement of the members 2 brings the latter into a position in which a notch 39 in the members 2 comes into engagement against the rear face 7 of the wall (see FIG. 2). When the operation of the screw 3 is continued, the members 2 are rotated still further, thus permitting the disengagement of their end 35 from the slot 34 provided in the member 32. The member 33 continues to move longitudinally, pushing the members 32 against the wall 4, thus locking the plug on the wall (see FIG. 3).

Figure 3:
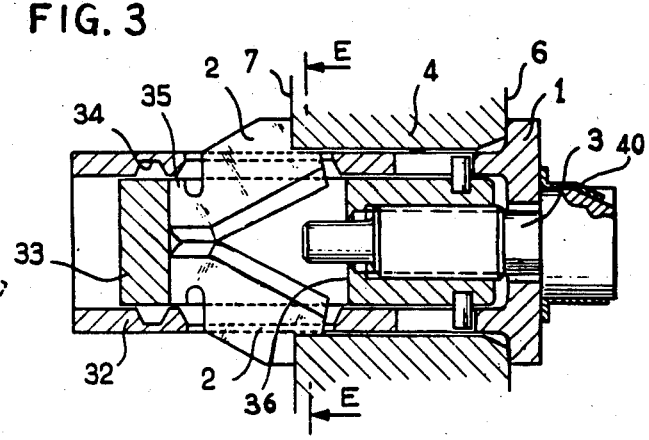

As shown in FIG. 3, it is possible to provide on the member forming the base 1 a positive locking or braking device 40 fitted to the head 15 of the screw 3 and intended to lock this screw once the plug has been installed.

The plug is removed in the reverse manner by turning the screw 3 counterclockwise. The member 33 is then pushed back to the left (as shown in the drawings), and the internal faces of the recesses come to bear against the gripping members 2 to push them back in turn. When the members 2 contact the end of recesses of the members 32, they rotate to come back inside the member 33. Their ends 35 re-enter the slot 34 to return to the position shown in FIG. 1. In this position the plug can be removed from the aperture.

The expanding plug according to the invention provides the advantage of requiring a minimum number of component parts, and avoids brittleness of these parts.

What is claimed is:

1. Expanding plug intended for closing an aperture provided in a wall accessible from only one side, comprising
   (a) a base which is applied against the front face of said wall;
   (b) a tubular member connected to said base and having an internal groove;
   (c) a central member mounted for movement in axial translation in said tubular member and having a threaded hole along the axis of said aperture, at least two radial recesses and a radial face at the end part of each recess;
   (d) at least two gripping members each mounted for sliding movement in a recess of said central member, permitting their radial displacement through pivoting displacement in the plane of the corresponding recess, said gripping members each having a radial shoulder and a radial projection near its rear part received in said internal groove of said tubular member, said plug being so disposed in said aperture that said gripping members are inserted in said aperture with their radial shoulder and radial projection protruding on the rear side of said wall; and
   (e) a screw control member screwing in the threaded hole of said central member to effect the axial displacement of said central member and, when the radial face of the corresponding recess contacts the rear part of a gripping member, the simultaneous axial and radial displacement of said gripping member, said radial displacement being obtained by pivoting of said gripping member the radial projection of which is engaged in the internal groove of said tubular member, until the shoulder of said gripping member is applied against the rear face of said wall.

* * * * *